May 23, 1944.  R. A. GOEPFRICH  2,349,346
SEALING MEANS
Filed Feb. 21, 1942
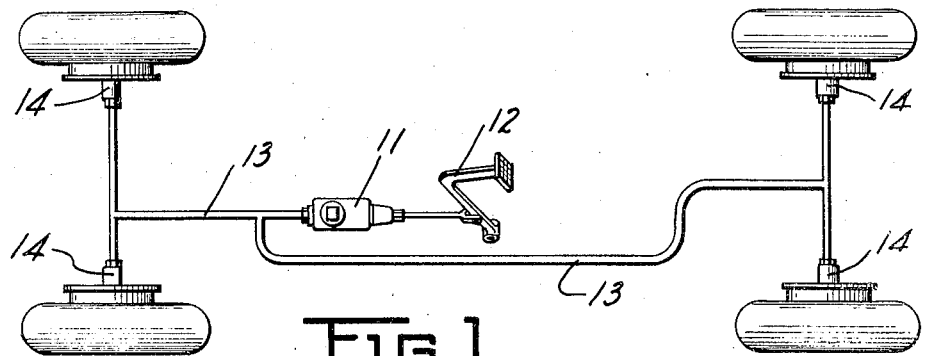
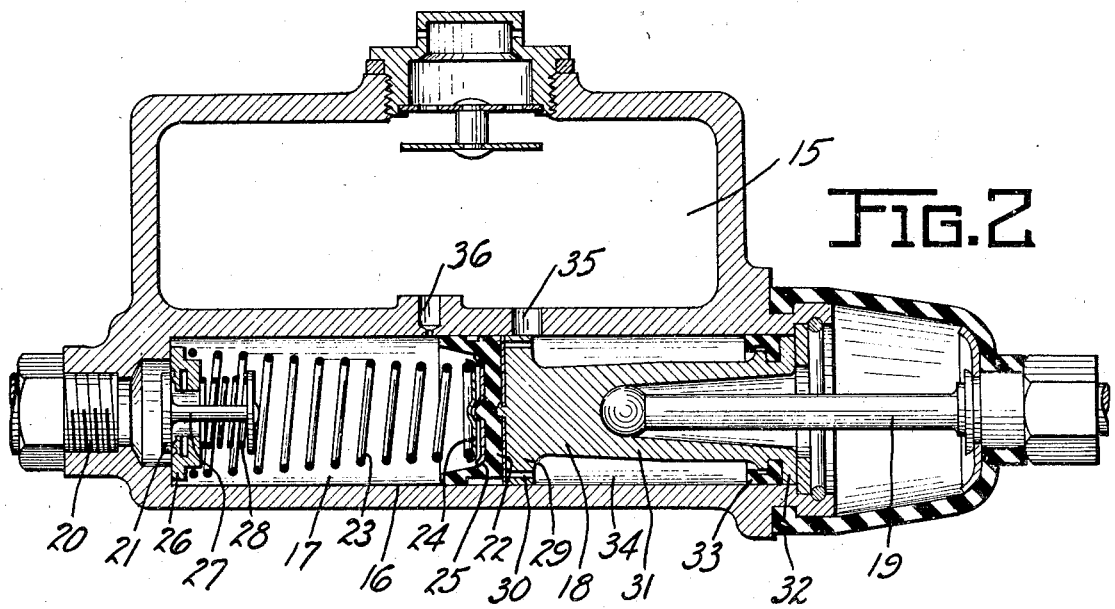
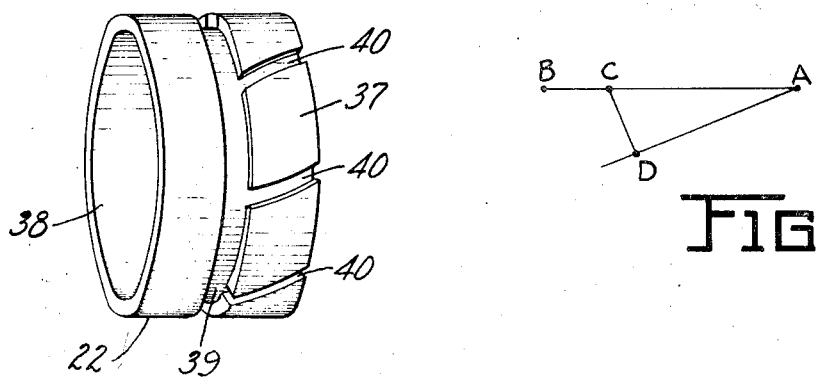
INVENTOR
RUDOLPH A. GOEPFRICH
BY
M. W. McConkey
ATTORNEY Patented May 23, 1944

2,349,346

UNITED STATES PATENT OFFICE 2,349,346

SEALING MEANS

Rudolph A. Goepfrich, South Bend, Ind., assignor to Bendix Aviation Corporation, South Bend, Ind., a corporation of Delaware Application February 21, 1942, Serial No. 431,794

8 Claims. (Cl. 60—54.6)

This invention relates to fluid pressure devices and particularly to the construction of sealing elements used in conjunction with such fluid pressure devices.

In pressure producing devices, as for example master cylinders in hydraulic brake systems, it is customary to provide a pressure chamber in which fluid may be placed under pressure and a reservoir for storing a volume of liquid under atmospheric pressure to be used in compensating for losses of fluid in the pressure chamber and in the motor which the pressure producing device operates, the reservoir also being used to receive fluid from the pressure chamber as the fluid in the chamber expands. A port, called a compensating port, is customarily provided between the reservoir and the pressure chamber of the pressure producing device. Likewise a piston is provided reciprocable in the pressure chamber and in order to prevent leakage of liquid past the piston during the pressure stroke thereof, a sealing means, as, for example, a sealing cup, is associated with the piston, said sealing means customarily being formed of resilient material so that the pressure of the fluid in the pressure chamber forces the sealing means against the chamber wall to create a pressure seal. It is necessary that the sealing cup, which is usually positioned on the head of the piston be so situated when the piston is in retracted position that free flow of fluid between the pressure chamber and the reservoir through the compensating port is allowed. However, as soon as possible after the pressure stroke of the piston begins, the sealing cup must cover the compensating port so that pressure will be created in the pressure chamber instead of simply forcing liquid through the compensating port to the reservoir.

After the lip of the sealing cup passes over the compensating port the pressure of the fluid in the pressure chamber tends to force the said lip into the compensating port, with the result that further movement of the piston on its pressure stroke tends to cause wear and scuffing of the cup lip. In the master cylinders in general use, the sealing cup always presents the same surface to the compensating port, so that constant use of the master cylinder will cause considerable wear on a single point on the circumference of the cup lip, with the result that the cup may eventually wear through at this point allowing fluid to escape past the piston and destroying the effectiveness of the brakes or other device operated by the fluid pressure system.

It is the object of this invention to provide automatic means for rotating the sealing cup of a hydraulic pressure producing device on each retracting stroke of the piston to thereby present new cup surfaces to the compensating port with each successive actuation and thus to reduce wear on the cup lip. Other objects and features of my invention will become apparent during the course of the following description, reference being had therein to the accompanying drawing, in which:

Figure 1 is a diagrammatic showing of a hydraulic brake system incorporating my invention;

Figure 2 is a vertical section taken through the master cylinder of Figure 1;

Figure 3 is a view in perspective of the sealing cup shown in Figure 2; and

Figure 4 is a side view of said sealing cup illustrating the force tending to rotate the sealing cup during the return stroke of the master cylinder piston.

The brake system of Figure 1, which is shown for illustrative purposes only, comprises a master cylinder 11, a lever 12 for actuating the master cylinder, a plurality of hydraulic conduits 13 leading from the master cylinder, and a plurality of hydraulically operable brakes indicated generally at 14 connected to the conduits 13.

The master cylinder 11, as shown in close up in Figure 2, comprises a reservoir 15 for storing liquid under atmospheric pressure, a cylinder bore 16 forming a pressure chamber 17 ahead of a piston 18 which is reciprocable in the cylinder bore, a rod 19 connecting the piston 18 to the lever 12 to allow the piston to be manually actuated, a port 20 connecting the pressure chamber 17 to the conduits 13, a two-way check valve 21 of a type well known in the art to control communication between chamber 17 and port 20, a sealing cup 22 positioned on the head of piston 18, and a compression spring 23 between the check valve 21 and the sealing cup 22. The spring 23 bears against the sealing cup 22 through the medium of a metal plate 24 associated with the spring and a metal plate 25 resting against the sealing cup. The two plates have small central projections extending one into the other and holding the rest of the surface area of the plates apart so that the one plate may rotate relative to the other without undue friction. The check valve 21 comprises a resilient washer 26 urged by the spring 23 to seat against the wall at the end of the cylinder bore, and a poppet valve element 27 having a head urged by a spring 28 to seat against the washer 26 and having a stem extending through an opening in the center of the said washer. The piston 18 has a head portion 29 having a plurality of passages 30 extending longitudinally therethrough, a body or waist portion 31, and a skirt portion 32 having sliding contact with the cylinder wall and having a sealing element 33 associated therewith to prevent escape of fluid past the skirt 32. An annular chamber 34 is formed between the body or waist 31 of the piston and the interior of the cylinder wall, the chamber 34 being open to the reservoir 15 through a supply port 35. As long as piston 18 remains in retracted position, as shown in Figure 2, pressure chamber 17 is connected to reservoir 15 through compensating port 36. During the pressure stroke of the piston fluid communication between chamber 17 and reservoir 15 through port 36 is cut off by the sealing cup 22.

Referring particularly to Figures 3 and 4, it will be seen that the sealing cup 22 comprises a substantially flat base portion 37 and an annular lip extension 38, the base portion being positioned against the head of piston 18 and the lip having its outer edge or periphery engaging the inner wall of cylinder bore 16, the said lip extending from the base toward the left end of the cylinder bore, which has the port 20 and the check valve 21. Between the base 37 and the lip 38 of the sealing cup a circumferential groove 39 is formed in the outside of the sealing cup wall. A plurality of angular grooves 40 cut in the outer surface of the sealing cup 21 extend from the groove 39 to the bottom of the base portion 37. These grooves are, as stated, angular in direction, i. e., each of them extends along a line on the outer cylindrical surface of the sealing cup which is at an angle to an imaginary line drawn on said outer cylindrical surface parallel to the longitudinal axis of the cylinder bore 16.

Operation of the brake system incorporating my invention is as follows. When it is desired to operate the brakes the operator pushes on lever 12 with the result that rod 19 forces piston 18 to the left as seen in Figure 2. Movement of the piston to the left first causes the lip 38 of the sealing cup 22 to move over compensating port 36 cutting off communication between chamber 17 and reservoir 15. Further movement of piston 18 toward the left forces fluid under pressure from chamber 17 past poppet valve element 27 which is forced from its seat by the pressure of the fluid, past port 20 into conduits 13 and thence to hydraulic motors 14 to operate the vehicle brakes. When the pedal lever 12 is released, with the object of releasing the brakes, the pedal returns to its original position under the influence of its return spring, allowing the spring 23 to force piston 18 toward the right as seen in Figure 2 until the piston has returned to its original retracted position. Simultaneously return springs at the brakes begin moving the fluid back from the motors at the brake toward pressure chamber 17 of the master cylinder. In actual practice, as a general rule, the return springs at the brakes are not able to return fluid to pressure chamber 17 as speedily as return spring 23 moves the piston to its retracted position. The result is that a vacuum of some degree is created in the pressure chamber 17. It must be remembered that during the movement of piston 18 toward its retracted position chamber 17 is still cut off from the reservoir by piston cup 22. The vacuum creating tendency in chamber 17 is augmented by the effect of spring 23 in holding the washer 26 on its seat at the end of the cylinder wall so that the pressure of fluid returning from the brakes must overcome spring 23 and force from its seat the check valve, which in effect comprises the head of poppet valve element 27 and the washer 26, before fluid can return to pressure chamber 17. Since the annular chamber 34 behind the head of piston 18 is at all times open through port 35 to the reservoir there is a constant supply of fluid in chamber 34. When a vacuum is created in chamber 17, the vacuum tends to draw fluid from chamber 34 through the passages 30 in the head of piston 18, through the angular grooves 40 in the outer surface of the base of sealing cup 22 and past the lip of the sealing cup, which bends toward the center of the cylinder under the influence of the moving fluid. This flow of fluid from chamber 34 to chamber 17 during the return stroke of the piston serves to accomplish the turning or rotating of sealing cup 22 referred to above as being the means for automatically presenting a new surface of the cup lip to the compensating port with each successive stroke of the piston. The fluid passing from chamber 34 to chamber 17 tends to move along a straight line as indicated by the line $a$—$b$ in Figure 4. Assuming that the pressure exerted by the fluid in its movement under the influence of the vacuum in chamber 17 is represented by a distance $a$—$c$ along the line $a$—$b$, the force $a$—$c$ exerts itself in two ways: a component represented by the line $a$—$d$ which is parallel to the longitudinal line of grooves 40 tends to move the fluid through the grooves into chamber 17, while a component force indicated by the line $d$—$c$ which is perpendicular to the sides of grooves 40 tends to turn the sealing cup 22 about the longitudinal axis of the cylinder with the result that a new portion of the cup lip surface presents itself to the compensating port 34 after each return stroke of the piston 18. It will be noted that the sealing cup rotates in proportion to the length of the piston stroke. This is true because the length of time during which the rotative force is exerted depends on the length of the piston stroke. Since the amount of wear at the brake linings determines the amount of shoe movement necessary to effectively apply the brakes and since the amount of shoe movement determines the length of the piston stroke, the sealing cup will rotate less with new brake linings and more with worn brake linings. This non-uniform rotation assures with increased wear a farther staggered relation between the compensating port and any point on the cup.

Although I have described only a single embodiment of my invention, it will be apparent that many other uses will be found for the said invention, and it is therefore my intention not to limit the scope of my invention except by the terms of the appended claims.

I claim:

1. A sealing cup for a fluid pressure cylinder comprising a lip portion, and a base portion having a plurality of angular grooves in the outer cylindrical surface thereof, said lip portion and base portion being substantially equal in outer circumference in order that fluid flowing past the base portion toward the lip portion will be forced to flow through said angular grooves.

2. A sealing cup for a fluid pressure cylinder comprising a lip portion, and a base portion having a plurality of angular grooves extending substantially longitudinally of the cylinder, said lip portion and base portion being substantially equal in outer circumference in order that fluid flowing past the base portion toward the lip portion will be forced to flow through said angular grooves.

3. A master cylinder comprising a reservoir, a cylinder bore, a piston reciprocable in the cylinder bore and forming a pressure chamber at one side thereof and a supply chamber at the other side thereof, the supply chamber being normally connected by a supply port to the reservoir and the pressure chamber being connected by a compensating port to the reservoir whenever the piston is in its retracted position, a sealing cup mounted on the head of the piston having an annular lip extending into the pressure chamber to contact the inner cylindrical surface of the cylinder bore, and having a base portion with a plurality of angular grooves in the outer cylindrical surface thereof for allowing fluid to pass from the supply chamber to the lip of the cup.

4. A fluid pressure device comprising a cylinder, a piston reciprocable in the cylinder, sealing means associated with the piston, and means for automatically turning the sealing means about the longitudinal axis of the cylinder with each return stroke of the piston to its retracted position, said turning means comprising an angularly grooved surface formed integral with the sealing means, and the fluid in the fluid pressure device which exerts a force on the sealing means tending to rotate it about the axis of the cylinder whenever said fluid flows past the sealing means.

5. A fluid pressure device comprising a cylinder, a piston reciprocable in the cylinder, sealing means associated with the piston, and means for automatically turning the sealing means about the longitudinal axis of the cylinder with each full stroke of the piston, said turning means comprising an angularly grooved surface directly associated with the sealing means, and the fluid in the fluid pressure device which exerts a force on the sealing means tending to rotate it about the axis of the cylinder whenever said fluid flows past the sealing means.

6. A fluid pressure producing device comprising a reservoir, a cylinder bore, a piston reciprocable in the cylinder bore and forming a pressure chamber at one side thereof and a supply chamber at the other side thereof, the supply chamber being normally connected by a supply port to the reservoir and the pressure chamber being connected by a compensating port to the reservoir whenever the piston is in its retracted position, a sealing cup mounted on the head of the piston having an annular lip extending into the pressure chamber to contact the inner cylindrical surface of the cylinder bore, and having a base portion with a plurality of angular grooves in the outer cylindrical surface thereof for allowing fluid to pass from the supply chamber to the lip of the cup, a spring urging the sealing cup against the piston, and an anti-friction device between the spring and the sealing cup for allowing rotation of the cup, relative to the spring with a minimum of friction.

7. A fluid pressure producing device comprising a reservoir, a cylinder bore, a piston reciprocable in the cylinder bore and forming a pressure chamber at one side thereof and a supply chamber at the other side thereof, the supply chamber being connected to the reservoir whenever the piston is in advanced position and the pressure chamber being connected to the reservoir whenever the piston is in its retracted position, a sealing cup associated with the piston having an annular lip extending into the pressure chamber to contact the inner cylindrical surface of the cylinder bore and having a base portion with a plurality of angular grooves in the outer cylindrical surface thereof for allowing fluid to pass from the supply chamber to the lip of the cup.

8. For use with a piston reciprocable in a cylinder bore, a sealing cup mounted on the head of the piston having an annular lip extending into the cylinder bore to contact the inner cylindrical surface thereof, and having a base portion with a plurality of angular grooves in the outer cylindrical surface thereof for allowing fluid to pass from the rear of the cup to the lip of the cup, said lip and base portion being substantially equal in outer circumference in order that fluid flowing past the base portion toward the lip will be forced to flow through said angular grooves.

RUDOLPH A. GOEPFRICH.